United States Patent [19]

Yamamoto et al.

[11] Patent Number: 4,632,026
[45] Date of Patent: Dec. 30, 1986

[54] TRAY PRESSING DEVICE IN A RETORT STERILIZER FOR COOKING FOODS

[75] Inventors: Tsutomu Yamamoto, Nara; Toshinori Murakami, Osaka; Yoshiaki Tokuda, Kyoto; Tamio Nagai, Osaka, all of Japan

[73] Assignees: Hisaka Works, Ltd., Osaka; House Food Industrial Co. Ltd., Higashi, both of Japan

[21] Appl. No.: 606,392

[22] Filed: May 2, 1984

[30] Foreign Application Priority Data

May 10, 1983 [JP] Japan ................................. 58-70289

[51] Int. Cl.$^4$ ............................................ A47J 27/18
[52] U.S. Cl. ......................................... 99/349; 99/369
[58] Field of Search ................ 99/349, 369, 371, 483, 99/516; 422/297, 300, 302, 304; 91/525

[56] References Cited

U.S. PATENT DOCUMENTS

| | | | |
|---|---|---|---|
| 166,380 | 8/1875 | How | 99/369 |
| 1,176,287 | 3/1916 | Hall et al. | 422/302 X |
| 1,213,245 | 1/1917 | Parks | 99/516 X |
| 1,479,855 | 1/1924 | Hodges | 91/525 |
| 2,629,312 | 2/1953 | Davis | 99/371 |
| 3,480,451 | 11/1969 | Hardison | 99/359 |
| 3,750,563 | 8/1973 | Tonjum | 99/349 X |
| 3,842,796 | 10/1974 | Hilditch et al. | 422/300 X |
| 4,210,675 | 7/1980 | Liebermann | 99/483 X |
| 4,224,864 | 9/1980 | Wendell | 99/349 |
| 4,310,374 | 1/1982 | MacMillan | 422/302 X |
| 4,322,196 | 3/1982 | Hinshaw | 99/371 X |

FOREIGN PATENT DOCUMENTS

| | | | |
|---|---|---|---|
| 2845318 | 9/1979 | Fed. Rep. of Germany | 99/483 |
| 129805 | 1/1889 | France | 99/369 |
| 654257 | 3/1979 | U.S.S.R. | 422/300 |

Primary Examiner—Harvey C. Hornsby
Assistant Examiner—Frankie L. Stinson
Attorney, Agent, or Firm—Moonray Kojima

[57] ABSTRACT

A tray pressing device in a retort sterilizer for cooking foods, movable upward and downward individually, is provided correspondingly to each line of a tray at the uppermost stage of the tray. The tray pressing device comprises a plurality of trays which are in the retort sterilizer, a tray pressing plate which presses and covers the uppermost stage of trays in order to prevent from relieving the foods, a drive source which is installed on the retort sterilizer, and a connecting shaft which is connected the tray pressing place with the drive source. The tray pressing plate can be operated individually from the external section of the retort and be moved downward by its own weight and upward by the drive source installed on the retort through the connecting shaft. The foods are processed under high pressure and high temperature of hot water in the retort sterilizer.

1 Claim, 5 Drawing Figures

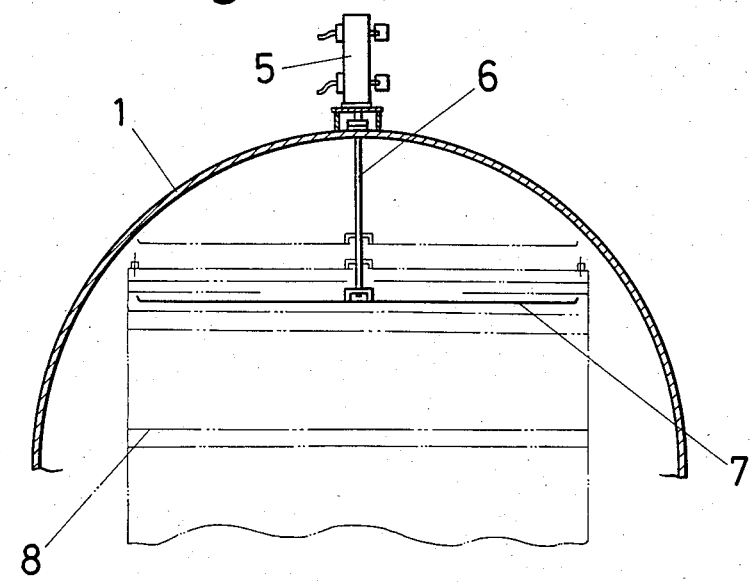
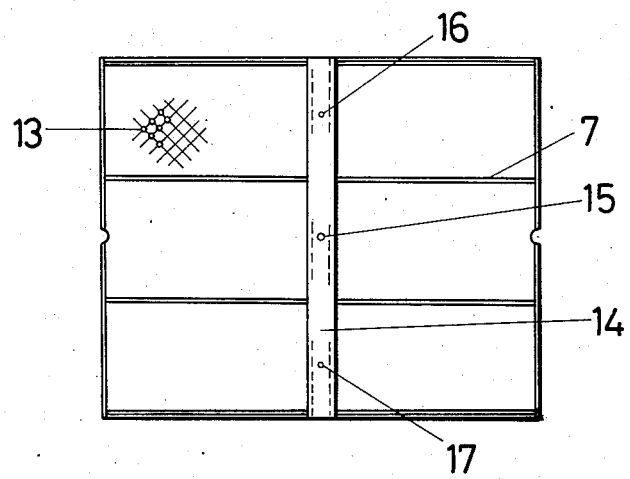

TRAY PRESSING DEVICE IN A RETORT STERILIZER FOR COOKING FOODS

BACKGROUND OF THE INVENTION

1. Field of the Invention

The present invention related to a tray pressing device in a retort sterilizer for cooking foods such as pouched foods or packaged foods.

2. Discussion of the Prior Art

The conventional pressing device for tray covers housed in a rotary type of the retort sterilizer wherein the pouched foods are sterilized and cooked under high-temperature and high-pressure is disclosed by Japanese Utility Model Publication No. Sho 53-50695. The pressing device which has a plurality of tray covers located on each line of stacked trays at the uppermost stage and is freely operated externally of the retort, at the same time is enable to be shutted as well as a constant differential pressure is always maintained with regard to the pressure in the retort so as to ensure the accurate closing thereof.

Nevertheless, this device requires a complicate mechanism comprising a rotary shaft, a connection shaft, and a pressurizing pump, because it employs a structure in which hot water is circulated in the retort as well as the rotation of a cage occurs simultaneously.

Japanese Patent Disclosure No. Sho 56-88785 discloses a method of loading a basket in a rotary type of retort sterilizer set up in horizontal situation and its apparatus. This technology also uses the rotary cage comprising a body frame and right and left rollers. It cannot avoid the complicate structure either due to the provision of the rotary cage.

The conventional device adopting not the rotary type but a stationary type either uses a void tray or is equipped with the tray cover at the uppermost stage so as to prevent the relief of the pouched foods. In the former case, however, when stacking up the void tray, a line of automatic stacking up and conveying devices must be incorporated so that the tray at the uppermost stage may be void, and on the other hand, the latter case needs the installation of the tray cover and its adjustment.

SUMMARY OF THE INVENTION

An object of the present invention is to overcome the aforementioned disadvantages of the prior art by eliminating the tray covers.

Another object is to provide the tray pressing device in a retort sterilizer for cooking foods.

A further object is to provide the tray pressing device wherein the pouched foods can be loaded into the tray and also at the uppermost stage of them.

A still further object is to provide the tray pressing device which can be pressed the uppermost stage of trays and to prevent from relieving the pouched foods.

A still another object is to provide a drive and load adjustment of the tray pressing plate which can be operated from the external section of the retort.

The trays pressed by the tray pressing device according to the present invention are numerously stacked up, while a compartment in each of them being automatically loaded up with the pouched foods, and are conveyed to the conveyor in the retort, being arranged in a plurality of lines at the predetermined position. For the food loading up the tray, beyond the limitation to the pouched foods, the present tray may be applicable to the other packaged foods and, tentatively, the pouched food is herein examplified:

The tray pressing plate, movable upward and downward individually, is provided correspondingly to each line of the tray at the uppermost stage, being connected through the piston coupled-extended shaft to the drive source installed externally of the retort. The mode of an embodiment adapts the tray pressing plate to make a descent by means of dead weight acting through the piston coupled-extended shaft and to make an ascent by means of the drive source, employing the perforated plate as the tray pressing plate.

The foregoing utilization of the dead weight of the tray pressing plate may be based on the probability of the mechanism in which the dead weight of the pressing plate can give an adequate pressing force to the tray at the uppermost stage among the stacked ones, when performing the sterilized cooking of the pouched food by means of the stationary type of the retort using hot water or steam. In that case, in order to move up the pressing plate, an air cylinder is utilized through the piston coupled-extended shaft. If the tray pressing plate is driven by the air cylinder installed externally of the retort, a proper decrease in pressure may enable the load on the air cylinder to be optional.

BRIEF DESCRIPTION OF DRAWINGS

FIG. 3 is an enlarged front view of the inlet section thereof, FIG. 4 is a plane view of the tray pressing plate.

DETAILED DESCRIPTION OF PREFERRED EMBODIMENT

Figure 1:
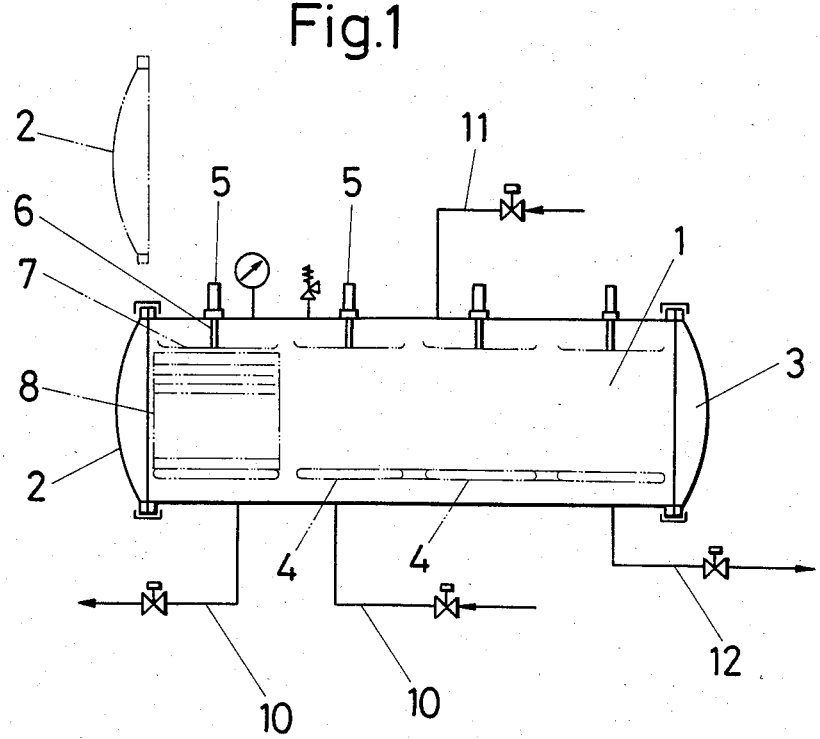
FIG. 1 is an entire rout view of the retort sterilizer equipped with the present device.
Figure 2:
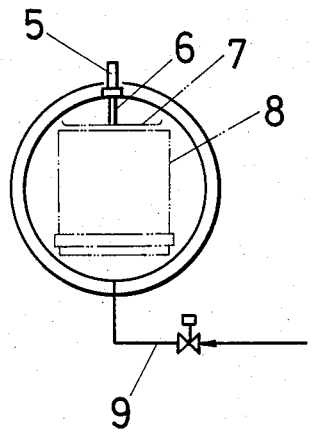
FIG. 2 is a front view of the inlet section of said retort sterilizer.
Figure 5:
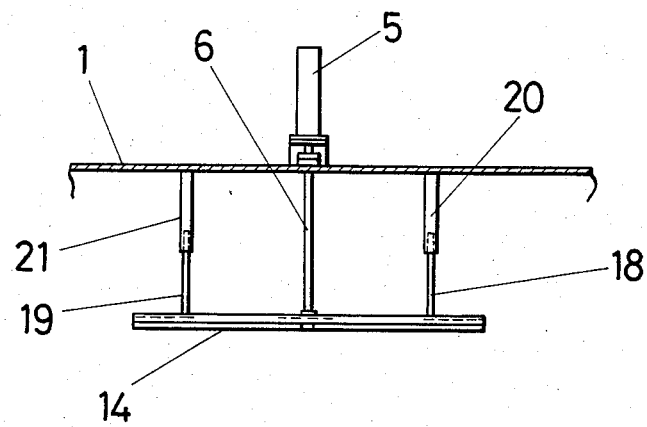
FIG. 5 is an enlarged side view of the mounting section of the tray pressing plate.

Turning to FIGS. 1 and 2, 1 is the retort sterilizer, 2 and 3 are closing covers of the retort sterilizer, 4 is a conveyor installed internally of the retort sterilizer, 5 is the drive source for the air cylinder, 6 is the piston coupled-extended shaft, 7 is a tray pressing plate, 8 is a plurality of stacked trays, 9 is a rout for steam, 10 is a supply and drainage route, 11 is air passage, and 12 is an exhaust route. FIG. 3 is an enlarged front view, taken from the inlet of the body of the retort sterilizer 1, of the tray pressing plate 7, FIG. 4 is an enlarged plane view of the tray pressing plate, and FIG. 5 is an enlarged side view; the tray pressing plate 7 is adapted to be fitted into the frame of the tray 8, its bottom surface being made up by the perforated plate 13 using a punched metal. 14 is a mounting section, the shaft hole 15 of which receives the piston coupled-extended shaft 6. 16 and 17 are mounting holes for guide round rods 18 and 19, which are inserted into guide pipes 20 and 21 provided on the internal wall of the retort. The arrangement that a plurality of stacked trays are provided in the retort may make it possible that if the tray pressing plate 7 and the coupled-extended shaft 6 supporting the plate and the drive source 5 are provided correspondingly to each of lines of trays, thereby driving individually the trays, an individual adjustment thereof is automated correspondingly to the condition of each line of tray. If the air cylinder is used for driving the tray pressing plate, the pressing pressure can be adequately adjusted by decreasing the same and if a lead switch is mounted, the detecting process of the ascent and descent position of the tray pressing plate becomes easier, whereby the condition of the tray pressing plate can be detected.

No matter how different the form of stacking the trays to be conveyed into the retort becomes, if a natural dropping system being properly operated by the dead weight of the tray pressing plate is adopted, any unnecessary pressing force is not exerted to them so that the adequate fixing of them can be finished. A free change in the form of stacking them is possible within the tolerance of the piston coupled-extended shaft, the automatic performance of stacker becoming easier.

The foregoing arrangement does not burden the carrier formed in the retort sterilizer with a load to too much extent, an effect of protecting the carrier and a pallet being produced. Furthermore, if the piston coupled-extended shaft is made longer, the adjusting range, caused by the natural dropping, may be extended, the stacking trays to full extent of the effective height of the retort becoming possible. In order to pull up the tray pressing plate, a cylinder, if utilized, perform accurately the requisite process. In addition to that, if a danger of floating the pouched foods in the tray takes place, it is possible to use the dropping caused by the dead weight and the forced pressurizing by the cylinder at the same time.

When the air cylinder is used as the drive source for the tray pressing plate, an optional arrangement can be performed by decreasing the pressure as well as an adequate selection of pressing force is possible. Such a necessity of arranging a void tray which is not loaded up with the pouched food and the tray cover on the upper most stage as occurred conventionally is eliminated and a direct using of the tray pressing plate makes it possible to press the tray from the upper section thereof so that the structure of the device is simplified.

What is claimed is:

1. In a stationary retort sterilizer comprising a conveyor positioned toward a bottom of said sterilizer, a plurality of stacks horizontally disposed at predetermined positions on said conveyor in said sterilizer, said conveyor moving said stacks in and out of said sterilizer, each of said stacks comprising a plurality of vertically stacked trays, said trays each comprising a frame useable for stacking one tray on another and a tray surface for carrying pouched food or other food to be processed; the improvement comprising a plurality of driving means disposed on said sterilizer;

air pressure means disposed outside of said sterilizer and connected to said plurality of driving means;

a plurality of perforated pressing plates, each positioned inside said sterilizer and within said frame of the uppermost tray of each stack, said perforations enabling circulation of sterilizing atmosphere to the food carried on the uppermost tray;

a plurality of shafts, each connecting a respective driving means to a respective pressing plate;

a pair of telescoping rods associated with each pressing plate, said pair being disposed on either side of each shaft, and having one end connected to said inside of said sterilizer and another end connected to said respective pressing plate;

means for allowing said pressing plate to selectively and individually move downward under force of gravity to press downward the uppermost tray and cause said uppermost tray to apply downward pressure on the frames of the lower trays or on the food contained on the tray surfaces of the lower trays; and means for causing said air pressure to be selectively applied to said plurality of driving means, thereby to selectively and individually move upward said pressing plates.

* * * * *